United States Patent
Kusafuka

(10) Patent No.: US 11,412,206 B2
(45) Date of Patent: Aug. 9, 2022

(54) IMAGE DISPLAY DEVICE, IMAGE DISPLAY SYSTEM, AND MOBILE BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/265,866

(22) PCT Filed: Aug. 5, 2019

(86) PCT No.: PCT/JP2019/030775
§ 371 (c)(1),
(2) Date: Feb. 4, 2021

(87) PCT Pub. No.: WO2020/031979
PCT Pub. Date: Feb. 13, 2020

(65) Prior Publication Data
US 2021/0203915 A1   Jul. 1, 2021

(30) Foreign Application Priority Data
Aug. 8, 2018   (JP) .............................. JP2018-149167

(51) Int. Cl.
| | |
|---|---|
| *H04N 13/31* | (2018.01) |
| *H04N 13/383* | (2018.01) |
| *H04N 13/398* | (2018.01) |
| *B60K 35/00* | (2006.01) |

(52) U.S. Cl.
CPC ............. *H04N 13/31* (2018.05); *B60K 35/00* (2013.01); *H04N 13/383* (2018.05);
(Continued)

(58) Field of Classification Search
CPC ........ G02B 30/27; G02B 30/31; G02B 30/24; H04N 13/31; H04N 13/398; H04N 13/341;
(Continued)

(56) References Cited

U.S. PATENT DOCUMENTS

| | | |
|---|---|---|
| 2007/0091058 A1 | 4/2007 | Nam et al. |
| 2012/0188475 A1 | 7/2012 | Inoue |
| 2013/0286168 A1 | 10/2013 | Park et al. |
| 2014/0091991 A1* | 4/2014 | An .................... H04N 13/305 345/32 |

(Continued)

FOREIGN PATENT DOCUMENTS

| | | |
|---|---|---|
| CN | 1953563 A | 4/2007 |
| CN | 102610202 A | 7/2012 |

(Continued)

OTHER PUBLICATIONS

Ayuki Hayashishita, Hideki Kakeya, "Time-Division Multiplexing Parallax Barrier with Sub-Subpixel Phase Shift", SID 2018 DIGEST, p. 88, 1515-1518.

*Primary Examiner* — Farhan Mahmud
(74) *Attorney, Agent, or Firm* — Studebaker & Brackett PC

(57) ABSTRACT

An image display device includes a display panel, a barrier panel, and a controller. The display panel is configured to be able to form a first display region, to be able to display a right-eye image in a right-eye visible region of the first display region and display a left-eye image in a left-eye visible region of the first display region. The barrier panel is configured to be able to form a first barrier region and to form a light-transmitting portion and a dimming portion in the first barrier region. The controller is configured to display a portion located in the first display region as one parallax image frame including two sub-frames. The controller is configured to form the dimming region in the entire first barrier region during a frame change period including a timing of changing a display from the parallax image frame to a new parallax image frame.

15 Claims, 7 Drawing Sheets

(52) U.S. Cl.
CPC ... *H04N 13/398* (2018.05); *B60K 2370/1526* (2019.05); *B60K 2370/1529* (2019.05); *B60K 2370/23* (2019.05); *B60K 2370/31* (2019.05); *B60K 2370/347* (2019.05); *B60K 2370/349* (2019.05); *B60K 2370/52* (2019.05); *H04N 2213/001* (2013.01)

(58) Field of Classification Search
CPC .. H04N 13/315; H04N 13/337; H04N 13/317; H04N 13/361; H04N 13/351; G09G 3/003; G09G 3/3648
See application file for complete search history.

(56) References Cited

U.S. PATENT DOCUMENTS

| | | | |
|---|---|---|---|
| 2015/0245015 A1* | 8/2015 | Cho | H04N 13/354 348/59 |
| 2016/0004088 A1* | 1/2016 | Hamagishi | G09G 3/2003 359/463 |
| 2017/0168309 A1 | 6/2017 | Kasazumi et al. | |

FOREIGN PATENT DOCUMENTS

| | | |
|---|---|---|
| EP | 1 777 575 A2 | 4/2007 |
| EP | 2 663 081 A2 | 11/2013 |
| EP | 3 144 718 A1 | 3/2017 |
| JP | 2007-072217 A | 3/2007 |
| JP | 2007-114793 A | 5/2007 |
| JP | 2014-509465 A | 4/2014 |
| WO | 2015-174049 A1 | 11/2015 |

* cited by examiner

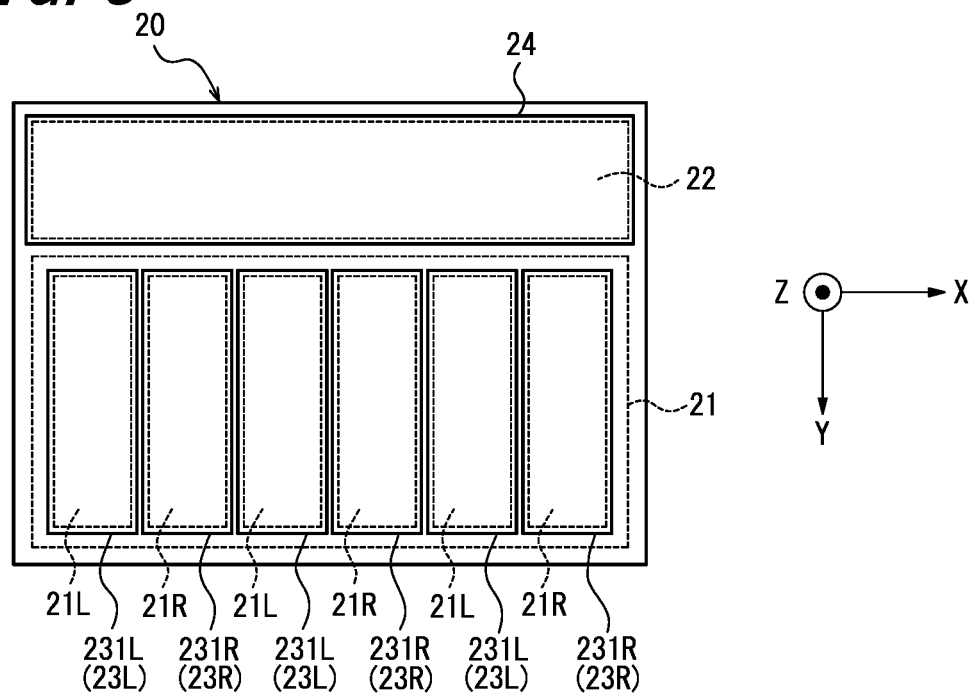
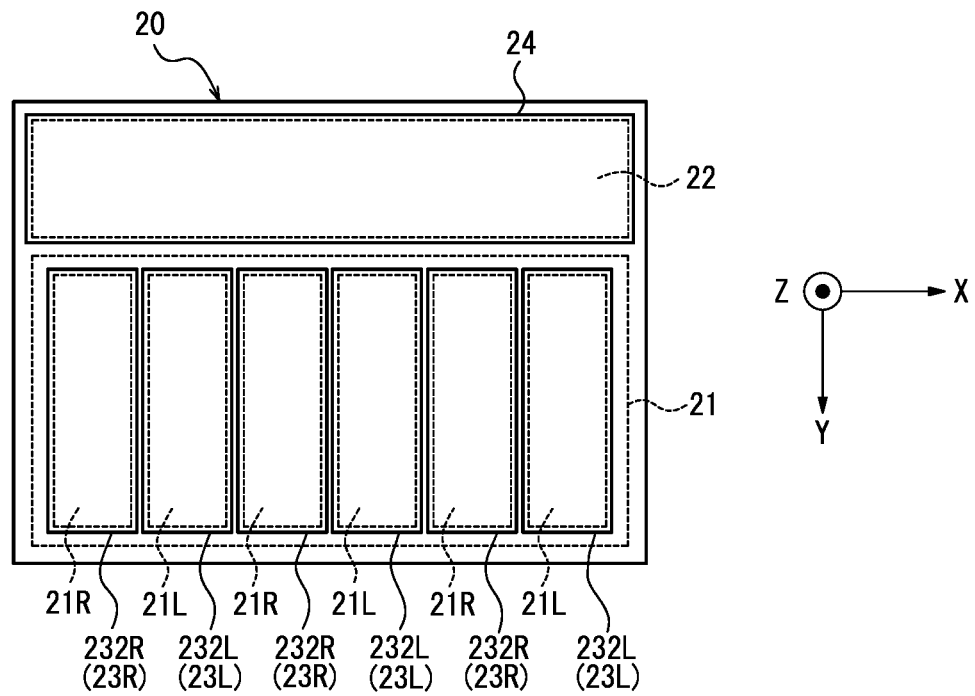

IMAGE DISPLAY DEVICE, IMAGE DISPLAY SYSTEM, AND MOBILE BODY

CROSS-REFERENCE TO RELATED APPLICATION

This application claims the priority of Japanese Patent Application No. 2018-149167 (filed on Aug. 8, 2018), the contents of which are incorporated herein by reference in its entirety.

TECHNICAL FIELD

The present disclosure relates to an image display device, an image display system, and a mobile body.

BACKGROUND

In a related art, there is known an image display device that projects a parallax image onto both eyes of a user by an active barrier to provide stereoscopic vision. The number of valid pixels of the parallax image projected on the left eye and the right eye of the user is not greater than half the number of valid pixels of the display panel. Therefore, a configuration is known in which the number of valid pixels of the parallax image is increased by driving the active barrier so that the images respectively projected on the left eye and the right eye of the user are exchanged between the even frame and the odd frame, which are displayed in one set. This technique is described, for example, in the following paper:

Ayuki Hayashishita, Hideki Kakeya, "Time-Division Multiplexing Parallax Barrier with Sub-Subpixel Phase Shift", SID 2018 DIGEST, P-88, 1515-1518.

SUMMARY

An image display device according to one embodiment of the disclosure includes a display panel, a barrier panel, and a controller. The display panel is configured to be able to display a plurality of frames. The barrier panel is positioned to overlap the display panel and is configured to be able to form a one or more light-transmitting portion and a one or more dimming portion by which a traveling direction of at least part of image light emitted from the display panel is directed to a right eye of a user and a traveling direction of at least part of the image light is directed to a left eye of the user. The controller is configured to be able to control the display panel and the barrier panel. The display panel is configured to be able to form a one or more first display region. The display panel is configured to be able to display a right-eye image visually recognized by the user's right eye in a one or more right-eye visible region of the one or more first display region. The display panel is configured to be able to display a left-eye image visually recognized by the user's left eye in a one or more left-eye visible region of the one or more first display region. The barrier panel is configured to be able to form a one or more first barrier region corresponding to the one or more first display region. The barrier panel is configured to form the one or more light-transmitting portion and the one or more dimming portion in the one or more first barrier region so that the one or more right-eye visible region and the one or more left-eye visible region are located at different positions in the one or more first display region. The controller is configured to display a portion located in the one or more first display region as one parallax image frame including a first sub-frame and a second sub-frame when displaying two consecutive frames on the display panel. The controller is configured to be able to control the display panel and the barrier panel so that the user visually recognizes images displayed in the first sub-frame and the second sub-frame included in the one parallax image frame as one parallax image. The controller is configured to be able to control display of the parallax image in the one or more first display region and formation of the one or more light-transmitting portion and the one or more dimming portion in the one or more first barrier region for each parallax image frame. The controller is configured to form the one or more dimming portion in entirety of the one or more first barrier region during a frame change period including a timing of changing a display from the parallax image frame to a new parallax image frame.

An image display system according to one embodiment of the disclosure includes an image display device and a reflective member. The image display device includes a display panel, a barrier panel, and a controller. The display panel is configured to be able to display a plurality of frames. The barrier panel is positioned to overlap the display panel and is configured to be able to form a one or more light-transmitting portion and a one or more dimming portion by which a traveling direction of at least part of image light emitted from the display panel is directed to a right eye of a user and a traveling direction of at least part of the image light is directed to a left eye of the user. The controller is configured to be able to control the display panel and the barrier panel. The display panel is configured to be able to form a one or more first display region. The display panel is configured to be able to display a right-eye image visually recognized by the user's right eye in a one or more right-eye visible region of the one or more first display region. The display panel is configured to be able to display a left-eye image visually recognized by the user's left eye in a one or more left-eye visible region of the one or more first display region. The barrier panel is configured to be able to form a one or more first barrier region corresponding to the one or more first display region. The barrier panel is configured to form the one or more light-transmitting portion and the one or more dimming portion in the one or more first barrier region so that the one or more right-eye visible region and the one or more left-eye visible region are located at different positions in the one or more first display region. The controller is configured to display the portion located in the one or more first display region as one parallax image frame including a first sub-frame and a second sub-frame when displaying two consecutive frames on the display panel. The controller is configured to be able to control the display panel and the barrier panel so that the user visually recognizes images displayed in the first sub-frame and the second sub-frame included in the one parallax image frame as one parallax image. The controller is configured to be able to control display of the parallax image in the one or more first display region and formation of the one or more light-transmitting portion and the one or more dimming portion in the one or more first barrier region for each parallax image frame. The controller is configured to form the one or more dimming portion in entirety of the one or more first barrier region during a frame change period including a timing of changing a display from the parallax image frame to a new parallax image frame. The reflective member is configured to reflect the image light to reach the left eye and the right eye of the user.

The mobile body according to one embodiment of the disclosure includes an image display system. The image display system includes an image display device and a reflective member. The image display device includes a display panel, a barrier panel, and a controller. The display panel is configured to be able to display a plurality of frames. The barrier panel is positioned to overlap the display panel and is configured to be able to form a one or more light-transmitting portion and a one or more dimming portion by which a traveling direction of at least part of image light emitted from the display panel is directed to a right eye of a user and a traveling direction of at least part of the image light is directed to a left eye of the user. The controller is configured to be able to control the display panel and the barrier panel. The display panel is configured to be able to form a one or more first display region. The display panel is configured to be able to display a right-eye image visually recognized by the user's right eye in a one or more right-eye visible region of the one or more first display region. The display panel is configured to be able to display a left-eye image visually recognized by the user's left eye in a one or more left-eye visible region of the one or more first display region. The barrier panel is configured to be able to form a one or more first barrier region corresponding to the one or more first display region. The barrier panel is configured to form the one or more light-transmitting portion and the one or more dimming portion in the one or more first barrier region so that the one or more right-eye visible region and the one or more left-eye visible region are located at different positions in the one or more first display region. The controller is configured to display the portion located in the one or more first display region as one parallax image frame including a first sub-frame and a second sub-frame when displaying two consecutive frames on the display panel. The controller is configured to be able to control the display panel and the barrier panel so that the user visually recognizes images displayed in the first sub-frame and the second sub-frame included in the one parallax image frame as one parallax image. The controller is configured to be able to control display of the parallax image in the one or more first display region and formation of the one or more light-transmitting portion and the one or more dimming portion in the one or more first barrier region for each parallax image frame. The controller is configured to form the one or more dimming portion in entirety of the one or more first barrier region during a frame change period including a timing of changing a display from the parallax image frame to a new parallax image frame. The reflective member is configured to reflect the image light to reach the left eye and the right eye of the user.

BRIEF DESCRIPTION OF DRAWINGS

FIG. 8 is a diagram showing a display example of a display panel in a first sub-frame;

FIG. 9 is a diagram showing a display example of a display panel in a second sub-frame;

DETAILED DESCRIPTION

Figure 1:
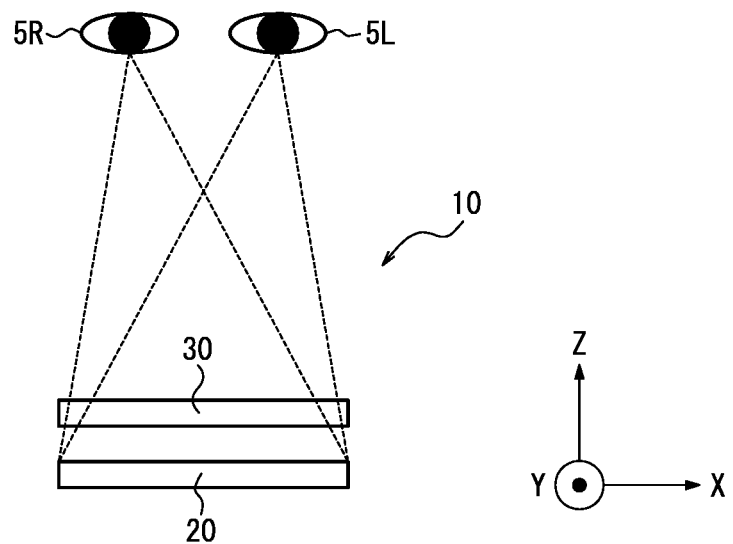
FIG. 1 is a side view showing a configuration example of an image display device according to one embodiment.
Figure 2:
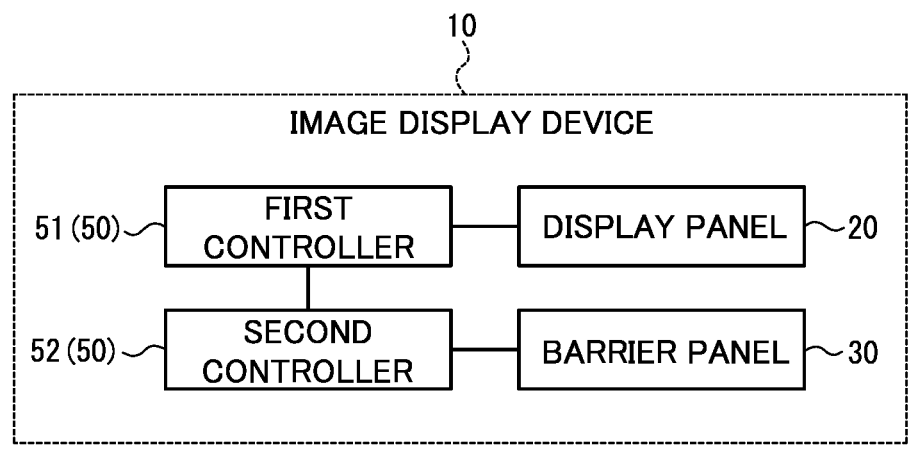
FIG. 2 is a block diagram showing a configuration example of the image display device according to one embodiment.

As shown in FIGS. 1 and 2, an image display device 10 according to one embodiment includes a display panel 20, a barrier panel 30, and a controller 50. The display panel 20 is configured to be able to display an image to be visually recognized by a user. The barrier panel 30 is configured to allow a part of image light emitted from the display panel 20 to reach one of a left eye 5L and a right eye 5R of the user and to allow another part of the image light to reach the other eye of the user. That is, the barrier panel 30 is configured so that a traveling direction of at least part of the image light is directed to the left eye 5L of the user and a traveling direction of at least part of the image light is directed to the right eye 5R of the user. The barrier panel 30 may be located on a side closer to the user than the display panel 20 or may be located on a side farther from the user than the display panel 20 when viewed from the user. The image light traveling in the direction determined by the barrier panel 30 can reach the left eye 5L and the right eye 5R of the user as different image lights. As a result, the user can visually recognize different images for each of the left eye 5L and the right eye 5R. That is, the image display device 10 can be configured to project a parallax image onto both eyes of the user. The parallax image is an image including separate images projected on each of the left eye 5L and the right eye 5R of the user and is an image that gives parallax to both eyes of the user. The user can see the image stereoscopically by viewing the parallax image with the left eye 5L and the right eye 5R. The direction that gives parallax to both eyes of the user is also called a parallax direction. The parallax direction corresponds to a direction in which the left eye 5L and the right eye 5R of the user are lined up.

The controller 50 is configured to be connected to each component of the image display device 10 to be able to control each component. The controller 50 may include a first controller 51 and a second controller 52. The first controller 51 may be configured to be able to control the display panel 20. The second controller 52 may be configured to be able to control the barrier panel 30. The first controller 51 and the second controller 52 may be configured to be able to be synchronized. The first controller 51 and the second controller 52 may be configured to be controllable as a master-slave relationship. One of the first controller 51 and the second controller 52 may be configured to be controllable as a master and the other may be configured to be controllable as a slave. The controller 50 may further include a higher controller that is positioned above the first controller 51 and the second controller 52 and controls the first controller 51 and the second controller 52.

The controller 50 may be configured as, for example, a processor. The controller 50 may include one or more processors. The processor may include a general-purpose processor that loads a specific program and executes a specific function and a dedicated processor specialized for a specific process. The dedicated processor may include an application specific integrated circuit (ASIC). The processor may include a programmable logic device (PLD). The PLD may include an FPGA (Field-Programmable Gate Array). The controller 50 may be either a SoC (System-on-a-Chip) or a SiP (System In a Package) in which one or a plurality of processors cooperate. The controller 50 may be configured to include a storage unit to store various information, a program for operating each component of the image display device 10, and the like in the storage unit. The storage unit may be configured of, for example, a semiconductor memory or the like. The storage unit may be configured to function as a work memory of the controller 50.

The display panel 20 is configured to be able to display a plurality of left-eye images 23L (see FIG. 6) visually recognized by the user's left eye 5L, a plurality of right-eye images 23R (see FIG. 7) visually recognized by the user's right eye 5R, and a plane image 24 (see FIG. 8) visually recognized by both eyes of the user. The display panel 20 may be, for example, a liquid crystal device such as an LCD (Liquid Crystal Display). The display panel 20 may be a self-luminous device such as an organic EL (Electro-Luminescence) or an inorganic EL. If the display panel 20 is a self-luminous device, the barrier panel 30 is located closer to the user than the display panel 20.

Figure 3:
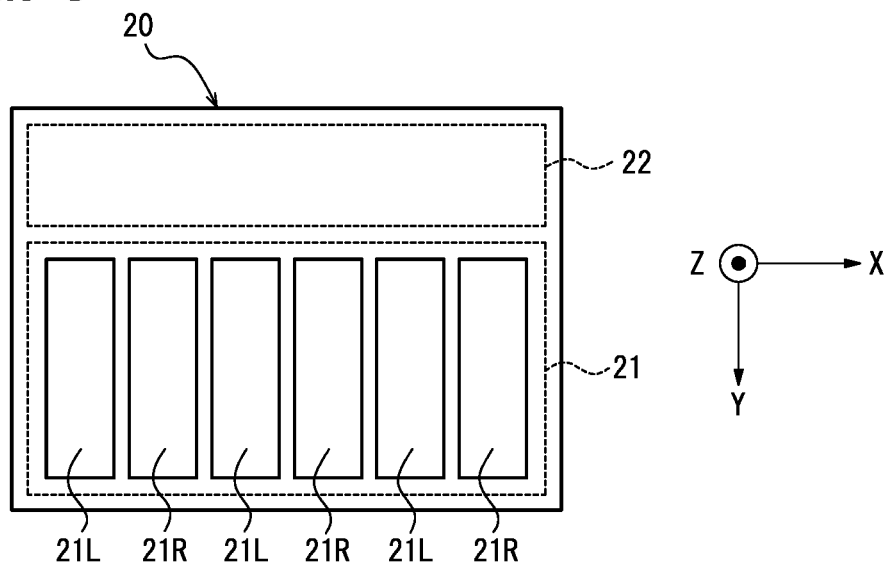
FIG. 3 is a plan view showing a configuration example of a display panel.

As shown in FIG. 3, the display panel 20 is configured to be able to form a one or more first display region 21 and a one or more second display region 22. The one or more first display region 21 includes a plurality of left-eye visible regions 21L visually recognized by the user's left eye 5L and a plurality of right-eye visible regions 21R visually recognized by the user's right eye 5R. The display panel 20 is configured to be able to display the left-eye image 23L in each left-eye visible region 21L and is configured to be able to display the right-eye image 23R in each right-eye visible region 21R. That is, the display panel 20 is configured to be able to display a parallax image in the plurality of left-eye visible regions 21L and the plurality of right-eye visible regions 21R. The plurality of left-eye visible regions 21L and the plurality of right-eye visible regions 21R are aligned in an X-axis direction. In the present embodiment, the parallax direction is associated with the X-axis direction. The X-axis direction is also called a horizontal direction or a first direction. A Y-axis direction is also called a vertical direction or a second direction. The one or more left-eye visible region 21L and the one or more right-eye visible region 21R may be located at intervals as illustrated in FIG. 3 or may be adjacent to each other. The display panel 20 is configured to be able to display the plane image 24 in the one or more second display region 22.

As shown in FIG. 3, the plurality of left-eye visible regions 21L and the plurality of right-eye visible regions 21R may extend along the Y-axis direction or may extend in a direction inclined at a predetermined angle with respect to the Y-axis direction. In other words, the plurality of left-eye visible regions 21L and the plurality of right-eye visible regions 21R may extend along a direction intersecting the parallax direction. The plurality of left-eye visible regions 21L and the plurality of right-eye visible regions 21R may be arranged alternately along a predetermined direction including components in the parallax direction. A pitch in which the one or more left-eye visible region 21L and the one or more right-eye visible region 21R are alternately arranged is also called a parallax image pitch.

The barrier panel 30 is configured so that the image light related to the plurality of left-eye images 23L reaches the user's left eye 5L and the image light related to the plurality of right-eye images 23R reaches the user's right eye 5R. The barrier panel 30 is configured to function as an active barrier.

Figure 4:
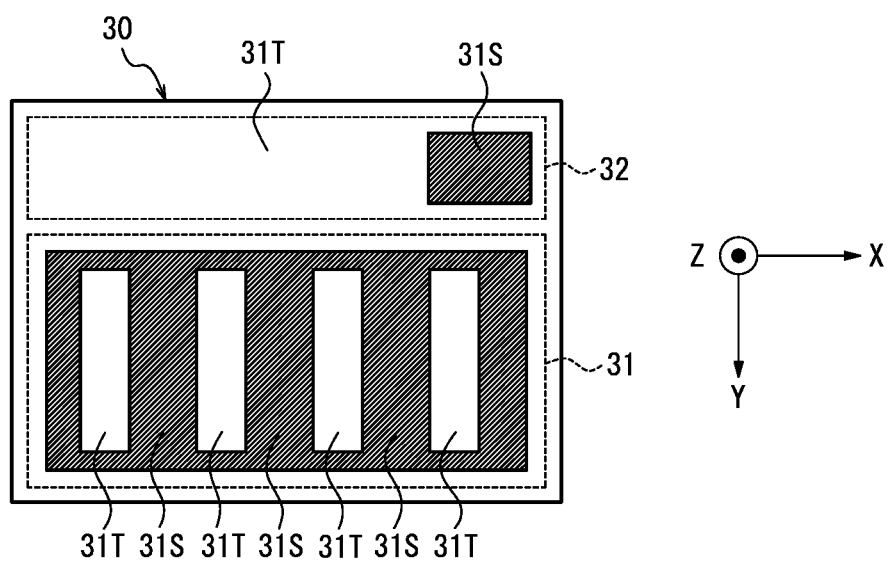
FIG. 4 is a plan view showing a configuration example of a barrier panel.

As shown in FIG. 4, the barrier panel 30 is configured to be able to form a one or more first barrier region 31 and a one or more second barrier region 32. If the barrier panel 30 is located closer to the user than the display panel 20 when viewed from the user, the barrier panel 30 is configured to be able to control the transmittance of the image light emitted from the display panel 20. The one or more first barrier region 31 corresponds to the one or more first display region 21 and is configured to be able to control the transmittance of the image light emitted from the one or more first display region 21. The one or more first barrier region 31 is configured to be able to form a plurality of light-transmitting portions 31T and a plurality of dimming portions 31S. The plurality of light-transmitting portions 31T are configured to transmit the light incident on the barrier panel 30 from the display panel 20. The plurality of light-transmitting portions 31T may be configured to transmit light with a transmittance equal to or higher than a first transmittance. The first transmittance may be, for example, 100% or may be a value close to 100%. The plurality of dimming portions 31S are configured to reduce the light incident on the barrier panel 30 from the display panel 20. The plurality of dimming portions 31S may be configured to transmit light with a transmittance equal to or lower than a second transmittance. The second transmittance may be, for example, 0% or may be a value close to 0%. The first transmittance is larger than the second transmittance. The first transmittance may be a value smaller than 50%, for example, 10%, as long as a sufficient contrast with the light transmitted through the plurality of dimming portions 31S can be secured. The second transmittance may be a value larger than around 0%, for example, 10%, as long as a sufficient contrast with the light transmitted through the plurality of light-transmitting portions 31T can be secured. A sufficient contrast ratio may be, for example, 100:1.

If the barrier panel 30 is located farther from the user than the display panel 20 when viewed from the user, the barrier panel 30 is configured to be able to control the transmittance of the light incident on the display panel 20. The plurality of light-transmitting portions 31T are configured to transmit the light incident on the display panel 20. The plurality of dimming portions 31S are configured to reduce the light incident on the display panel 20. By doing so, the one or more first barrier region 31 is configured to be able to control the transmittance of the light incident on the one or more first display region 21. The intensity of the image light emitted from the display panel 20 is controlled based on the intensity of the incident light. The traveling direction of the image light emitted from the display panel 20 is controlled based on the traveling direction of the incident light.

The barrier panel 30 is configured to form the plurality of light-transmitting portions 31T to allow the image light related to the plurality of left-eye images 23L to reach the user's left eye 5L and to allow the image light related to the plurality of right-eye images 23R to reach the user's right eye 5R. The barrier panel 30 is configured to form the plurality of dimming portions 31S so that the image light related to the plurality of left-eye images 23L does not reach or is difficult to reach the user's right eye 5R and the image light related to the plurality of right-eye images 23R does not reach or is difficult to reach the user's left eye 5L. The barrier panel 30 can be configured such that the user visually recognizes the plurality of right-eye images 23R with the right eye 5R, while the left eye 5L does not visually recognize or is difficult to visually recognize the plurality of right-eye images 23R. The barrier panel 30 can be configured such that the user visually recognizes the plurality of left-eye images 23L with the left eye 5L, while the right eye 5R does not visually recognize or is difficult to visually recognize the plurality of left-eye images 23L. The barrier panel 30 is configured to form the plurality of light-transmitting portions 31T and the plurality of dimming portions 31S to define the direction of the image light related to the parallax image including the plurality of left-eye images 23L and the plurality of right-eye images 23R.

The barrier panel 30 is configured to form the plurality of light-transmitting portions 31T and the plurality of dimming portions 31S so that the plurality of light-transmitting portions 31T and the plurality of dimming portions 31S are arranged alternately in the X-axis direction. The barrier panel 30 may be configured to form the plurality of light-transmitting portions 31T and the plurality of dimming portions 31S so that the boundaries between the plurality of light-transmitting portions 31T and the plurality of dimming portions 31S are along the Y-axis direction as illustrated in FIG. 4, or along the direction inclined at a predetermined angle with respect to the Y-axis direction. The barrier panel 30 may be configured to form the plurality of light-transmitting portions 31T and the plurality of dimming portions 31S so that the boundaries between the plurality of light-transmitting portions 31T and the plurality of dimming portions 31S are along the direction intersecting the parallax direction. In other words, the barrier panel 30 may be configured to form the plurality of light-transmitting portions 31T and the plurality of dimming portions 31S so that the plurality of light-transmitting portions 31T and the plurality of dimming portions 31S are alternately arranged along a predetermined direction including the components in the parallax direction.

The shapes of the plurality of light-transmitting portions 31T and the plurality of dimming portions 31S may be determined based on the shapes of the plurality of left-eye visible regions 21L and the plurality of right-eye visible regions 21R. Conversely, the shapes of the plurality of left-eye visible regions 21L and the plurality of right-eye visible regions 21R may be determined based on the shapes of the plurality of light-transmitting portions 31T and the plurality of dimming portions 31S.

The one or more second barrier region 32 corresponds to the one or more second display region 22 and is configured to be able to control the transmittance of the image light emitted from the one or more second display region 22.

The barrier panel 30 may be configured of a liquid crystal shutter. The liquid crystal shutter can be configured to be able to control the light transmittance based on the applied voltage. The liquid crystal shutter may be configured of a plurality of pixels and may be configured to be able to control the light transmittance in each pixel. The liquid crystal shutter may be configured so that a region having a high light transmittance or a region having low light transmittance can be formed in any shape. If the barrier panel 30 is configured of a liquid crystal shutter, the plurality of light-transmitting portions 31T may have a transmittance equal to or higher than the first transmittance. If the barrier panel 30 is configured of a liquid crystal shutter, the plurality of dimming portions 31S may have a transmittance equal to or less than the second transmittance.

The display panel 20 and the barrier panel 30 each include a plurality of pixels. An arrangement pitch of the plurality of pixels of the display panel 20 and an arrangement pitch of the plurality of pixels of the barrier panel 30 may be the same or different. In the present embodiment, it is assumed that the arrangement pitch of the plurality of pixels of the display panel 20 and the arrangement pitch of the plurality of pixels of the barrier panel 30 are the same. In this case, each pixel of the display panel 20 and each pixel of the barrier panel 30 are associated with each other. Each pixel of the barrier panel 30 may be configured to be controllable by any of the plurality of light-transmitting portions 31T and the plurality of dimming portions 31S. The controller 50 may be configured to be able to synchronize the control of each pixel of the display panel 20 with the control of each pixel of the barrier panel 30 associated therewith. The image quality can be improved by configuring to be able to synchronize the controls of the pixels of the display panel 20 and the barrier panel 30 that are associated with each other.

At least a part of the plurality of pixels included in the one or more second display region 22 may be configured to be able to display black. The region formed by the pixels displaying black is also called a black display region. The controller 50 may be configured to form the plurality of dimming portions 31S in a region of the barrier panel 30 corresponding to the black display region included in the one or more second display region 22. By doing so, the transmittance of the image light in the black display region becomes even lower. As a result, the black display region looks even blacker to the user.

Figure 5:
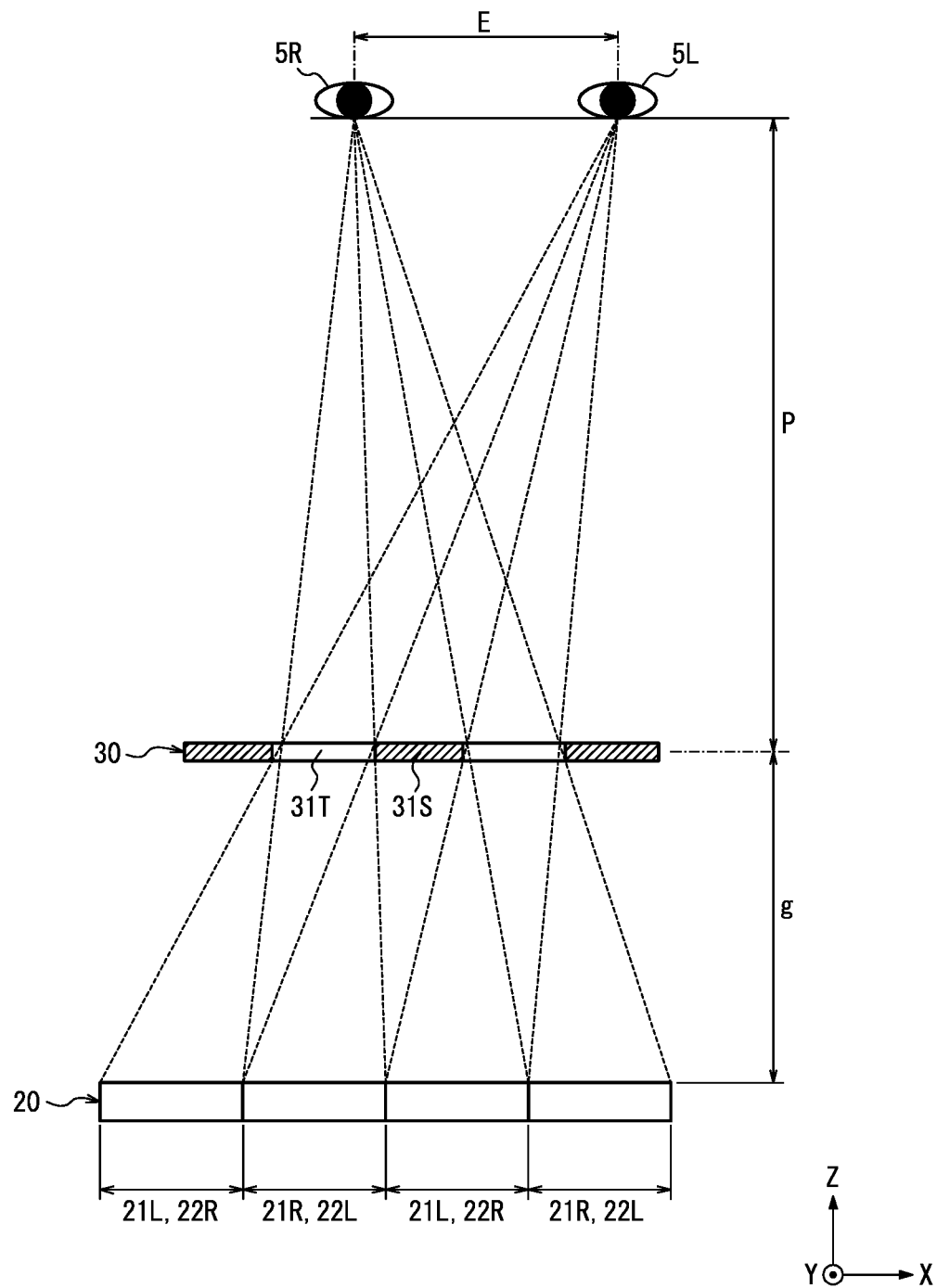
FIG. 5 is a diagram showing an example of how the image display device looks to a user.

In the configuration illustrated in FIG. 5, the barrier panel 30 is located between the left eye 5L and the right eye 5R of the user, and the display panel 20. The barrier panel 30 may be located farther from the user than the display panel 20 when viewed from the user. The barrier panel 30 is located along the display panel 20. It can be said that the barrier panel 30 is located to overlap with the display panel 20.

A distance between the left eye 5L and the right eye 5R of the user, and the barrier panel 30 is also called an observation distance and is represented as P. A pitch at which the one or more light-transmitting portion 31T and the one or more dimming portion 31S are arranged alternately in the X-axis direction is also called a barrier pitch. The distance between the left eye 5L and the right eye 5R is also called an inter-eye distance and is represented as E. A distance between the barrier panel 30 and the display panel 20 is also called a gap and is represented as g.

The display panel 20 is configured to form the plurality of left-eye visible regions 21L that can be visually recognized from the user's left eye 5L via the plurality of light-transmitting portions 31T, and a plurality of left-eye non-visible regions 22L that cannot be visually recognized or are difficult to be visually recognized from the user's left eye 5L due to the plurality of dimming portions 31S. The display panel 20 is configured to form the plurality of left-eye visible regions 21L and the plurality of left-eye non-visible regions 22L so that the plurality of left-eye visible regions 21L and the plurality of left-eye non-visible regions 22L are alternately arranged in the X-axis direction. A position of the boundary between the one or more left-eye visible region 21L and the one or more left-eye non-visible region 22L is determined by a position of the boundary between the one or more light-transmitting portion 31T and the one or more dimming portion 31S, the distance (P) from the barrier panel 30 to both eyes of the user, and the gap (g).

The display panel 20 is configured to form the plurality of right-eye visible regions 21R that can be visually recognized from the user's right eye 5R via the plurality of light-transmitting portions 31T, and a plurality of right-eye non-visible regions 22R that cannot be visually recognized or are difficult to be visually recognized from the user's right eye 5R due to the plurality of dimming portions 31S. The display panel 20 is configured to form the plurality of right-eye visible regions 21R and the plurality of right-eye non-visible regions 22R so that the plurality of right-eye visible regions 21R and the plurality of right-eye non-visible regions 22R are alternately arranged in the X-axis direction. A position of the boundary between the one or more right-eye visible region 21R and the one or more right-eye non-visible region 22R is determined by a position of the boundary between the one or more light-transmitting portion 31T and the one or more dimming portion 31S, the distance (P) from the barrier panel 30 to both eyes of the user, and the gap (g).

The display panel 20 may be configured to be able to display the parallax image so that each left-eye image 23L coincides with each left-eye visible region 21L. The display panel 20 may be configured to be able to display the parallax image so that each right-eye image 23R coincides with each right-eye visible region 21R. That is, the display panel 20 may be configured to be able to display the parallax image based on a position of the boundary between the one or more light-transmitting portion 31T and the one or more dimming portion 31S, the distance (P) from the barrier panel 30 to both eyes of the user, and the gap (g).

If the plurality of left-eye visible regions 21L and the plurality of right-eye visible regions 21R overlap at least in part along the X-axis direction, crosstalk can occur in which a part of the plurality of left-eye images 23L is projected onto the right eye 5R or a part of the plurality of right-eye images 23R is projected onto the left eye 5L. The crosstalk deteriorates the image quality of the parallax image projected on the user.

If the plurality of left-eye visible regions 21L and the plurality of right-eye visible regions 21R are arranged alternately in the X-axis direction without overlapping each other, the left eye 5L can visually recognize only the plurality of left-eye images 23L, and the right eye 5R can visually recognize only the plurality of right-eye images 23R. That is, the barrier panel 30 is configured to form the plurality of light-transmitting portions 31T and the plurality of dimming portions 31S in the one or more first barrier region 31 so that the plurality of left-eye visible regions 21L and the plurality of right-eye visible regions 21R are located at different positions in the one or more first display region 21. In this case, crosstalk can be reduced. The state in which the left eye 5L and the right eye 5R can visually recognize only the plurality of left-eye images 23L and the plurality of right-eye images 23R, respectively, can be realized when the observation distance (P) is an optimal viewing distance (OVD). The optimal viewing distance is determined based on the inter-eye distance (E), the gap (g), the barrier pitch, and the parallax image pitch. In other words, the controller 50 may be configured to be able to control the display panel 20 and the barrier panel 30 so that the observation distance (P) becomes the OVD. The controller 50 may be configured to be able to control the shapes and positions of the plurality of light-transmitting portions 31T and the plurality of dimming portions 31S in the barrier panel 30, and the shapes and positions of the plurality of right-eye images 23R and the plurality of left-eye images 23L displayed on the display panel 20 so that the observation distance (P) is OVD.

The image display device 10 may further include a configuration such as a camera that acquires positions of the eyes of the user. The controller 50 may be configured to be able to control the display panel 20 and the barrier panel 30 based on positions of the eyes of the user. Crosstalk can be further reduced by configuring the controller 50 to be able to control the one or more first display region 21 and the one or more first barrier region 31 based on the positions of the eyes of the user. The black display region looks even blacker to the user by configuring the controller 50 to be able to control the one or more second display region 22 and the one or more second barrier region 32 based on the positions of the eyes of the user.

The display panel 20 is configured so that the displayed image can be sequentially updated. If the display panel 20 updates the display image, it can be considered that the display panel 20 is displaying a moving image. The display panel 20 is configured to be able to sequentially display a plurality of frames, thereby enabling to display a moving image. In the present embodiment, the entire display region of the display panel 20 is regarded as one frame. When the entire display region is one frame, the display panel 20 is configured to be able to sequentially update the images to be displayed on the entire surface of the display surface, and thus, is configured to be able to sequentially display a plurality of frames. The number of frames displayed by the display panel 20 per unit time is also called a frame rate. The frame rate may be represented as the number of frames displayed by the display panel 20 per second.

The display panel 20 is configured to be able to display a parallax image including the plurality of right-eye images 23R and the plurality of left-eye images 23L displayed in the one or more first display region 21, and the plane image 24 displayed in the one or more second display region 22 in combination as a single frame.

Figure 6:
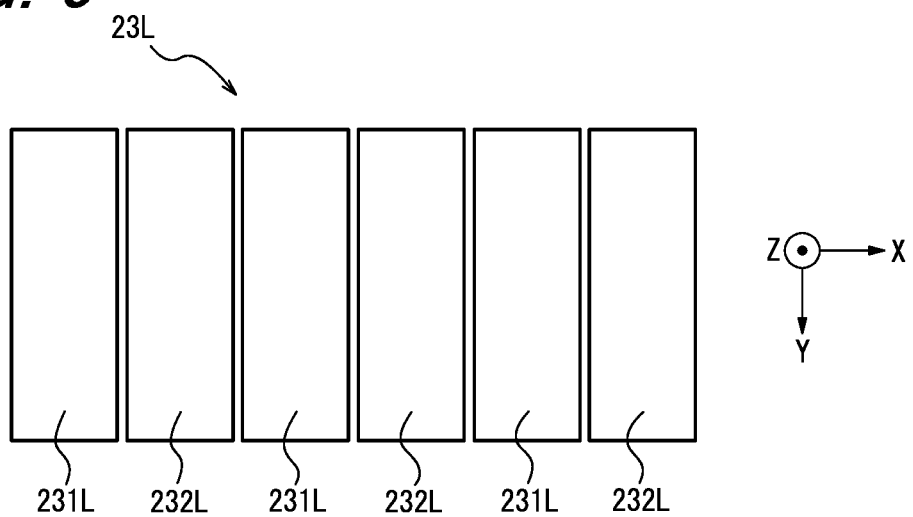
FIG. 6 is a diagram showing an example of a sub-left-eye image included in a left-eye image.
Figure 7:
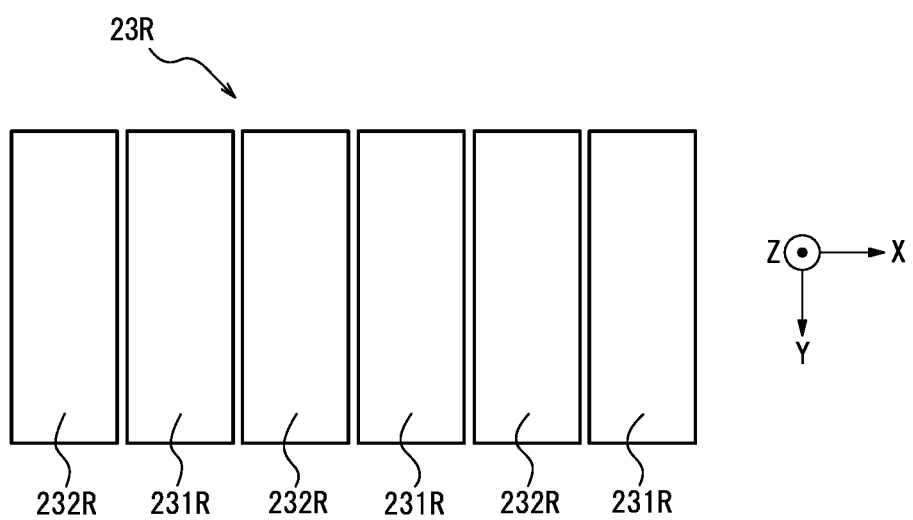
FIG. 7 is a diagram showing an example of a sub-right-eye image included in a right-eye image.

The parallax image includes at least a part of the plurality of left-eye images 23L illustrated in FIG. 6 and at least a part of the plurality of right-eye images 23R illustrated in FIG. 7.

The plurality of left-eye images 23L illustrated in FIG. 6 includes a plurality of first sub-left-eye images 231L and a plurality of second sub-left-eye images 232L. The plurality of first sub-left-eye images 231L and the plurality of second sub-left-eye images 232L do not overlap each other. In the present embodiment, the plurality of first sub-left-eye images 231L and the plurality of second sub-left-eye images 232L extend in the Y-axis direction and are alternately arranged in the X-axis direction in each left-eye image 23L. It is assumed that the number of pixels in the X-axis direction of each of the first sub-left-eye image 231L and the second sub-left-eye image 232L is set to ½ or less of the number of pixels in the X-axis direction of the left-eye image 23L. In other words, the full-pixel left-eye image 23L is divided into the first sub-left-eye image 231L and the second sub-left-eye image 232L, which have half or less of the number of pixels of the full pixel. The number of pixels of the first sub-left-eye image 231L can be different from the number of pixels of the second sub-left-eye image 232L.

The plurality of right-eye images 23R illustrated in FIG. 7 includes a plurality of first sub-right-eye images 231R and a plurality of second sub-right-eye images 232R. The plurality of first sub-right-eye images 231R and the plurality of second sub-right-eye images 232R do not overlap each other. In the present embodiment, the plurality of first sub-right-eye images 231R and the plurality of second sub-right-eye images 232R extend in the Y-axis direction and are alternately arranged in the X-axis direction in each right-eye image 23R. It is assumed that the number of pixels in the X-axis direction of each of the first sub-right-eye image 231R and the second sub-right-eye image 232R is set to ½ or less of the number of pixels in the X-axis direction of the right-eye image 23R. In other words, the full-pixel right-eye image 23R is divided into the first sub-right-eye image 231R and the second sub-right-eye image 232R, which have half or less of the number of pixels of the full pixel. The number of pixels of the first sub-right-eye image 231R may be different from the number of pixels of the second sub-right-eye image 232R.

The plurality of first sub-left-eye images 231L and the plurality of first sub-right-eye images 231R do not overlap each other. By doing so, the display panel 20 is configured to be able to simultaneously display the plurality of first sub-left-eye images 231L and the plurality of first sub-right-eye images 231R. The plurality of second sub-left-eye images 232L and the plurality of second sub-right-eye images 232R do not overlap each other. By doing so, the display panel 20 is configured to be able to simultaneously display the plurality of second sub-left-eye images 232L and the plurality of second sub-right-eye images 232R.

As shown in FIG. 8, the controller 50 is configured to cause the display panel 20 to display a frame including the plurality of first sub-left-eye images 231L and the plurality of first sub-right-eye images 231R as one parallax image in the one or more first display region 21. In the display panel 20, the controller 50 is configured to be able to control the one or more first barrier region 31 of the barrier panel 30 so that the display regions of the plurality of first sub-left-eye images 231L include the plurality of left-eye visible regions 21L and the display regions of the plurality of first sub-right-eye images 231R include the plurality of right-eye visible regions 21R. The controller 50 may be configured to be able to control the barrier panel 30 so that the display regions of the plurality of first sub-left-eye images 231L and the plurality of first sub-right-eye images 231R coincide with the plurality of left-eye visible regions 21L and the plurality of right-eye visible regions 21R. The controller 50 may be configured to be able to control the barrier panel 30 so that the plurality of left-eye visible regions 21L and the plurality of right-eye visible regions 21R include the display regions of the plurality of first sub-left-eye images 231L and the plurality of first sub-right-eye images 231R, respectively.

As shown in FIG. 9, the controller 50 is configured to cause the display panel 20 to display a frame including the plurality of second sub-left-eye images 232L and the plurality of second sub-right-eye images 232R in the one or more first display region 21 as one parallax image. In the display panel 20, the controller 50 is configured to be able to control the one or more first barrier region 31 of the barrier panel 30 so that the display regions of the plurality of second sub-left-eye images 232L include the plurality of left-eye visible regions 21L and the display regions of the plurality of second sub-right-eye images 232R include the plurality of right-eye visible regions 21R. The controller 50 may be configured to be able to control the barrier panel 30 so that the display regions of the plurality of second sub-left-eye images 232L and the plurality of second sub-right-eye images 232R coincide with the plurality of left-eye visible regions 21L and the plurality of right-eye visible regions 21R. The controller 50 may be configured to be able to control the barrier panel 30 so that the plurality of left-eye visible regions 21L and the plurality of right-eye visible regions 21R include the display regions of the plurality of second sub-left-eye images 232L and the plurality of second sub-right-eye images 232R, respectively.

When the user views the frame of FIG. 8 and the frame of FIG. 9 independently, the user visually recognizes one of the plurality of first sub-left-eye images 231L and the plurality of second sub-left eyes 232L as the plurality of left-eye images 23L. The user visually recognizes one of the plurality of first sub-right-eye images 231R and the plurality of second sub-right-eye images 232R as the plurality of right-eye images 23R. In this case, the number of pixels in the X-axis direction of each of the plurality of left-eye images 23L and the plurality of right-eye images 23R visually recognized by the user is ½ times or less of the full pixels.

When the user can see the frame of FIG. 8 and the frame of FIG. 9 together, the user can visually recognize the plurality of left-eye images 23L, which is a combination of the plurality of first sub-left-eye images 231L and the plurality of second sub-left-eye images 232L. The plurality of left-eye images 23L visually recognized by the user can be larger pixels than each of the plurality of first sub-left-eye images 231L and the plurality of second sub-left-eye images 232L. The plurality of left-eye images 23L visually recognized by the user can be regarded as full pixels. The user can visually recognize the right-eye image 23R, which is a combination of the plurality of first sub-right-eye images 231R and the plurality of second sub-right-eye images 232R. The plurality of right-eye images 23R visually recognized by the user can be larger pixels than each of the plurality of first sub-right-eye images 231R and the plurality of second sub-right-eye images 232R. The plurality of right-eye images 23R visually recognized by the user can be regarded as full pixels.

The controller 50 is configured to be able to control the display panel 20 and the barrier panel 30 so that the user visually recognizes the frame of FIG. 8 and the frame of FIG. 9 as two consecutive frames displayed on the display panel 20. By doing so, the user can visually recognize the afterimage of the frame displayed on the first sheet and the image of the frame displayed on the second sheet as one image. As a result, in one embodiment, the user can recognize that both the full-pixel left-eye image 23L and the full-pixel right-eye image 23R are displayed. The image composition using afterimages in the eyes of the user is also called human sensory composition.

If the controller 50 causes the display panel 20 to display the frame of FIG. 8 and the frame of FIG. 9 as two consecutive frames, the controller 50 is configured to cause the display panel 20 to display the portion located in the one or more first display region 21 as two sub-frames. The sub-frame contains a parallax image. Among the frames of FIG. 8, the portion located in the one or more first display region 21 is also called a first sub-frame. Among the frames of FIG. 9, the portion located in the one or more first display region 21 is also called a second sub-frame. The controller 50 is configured to cause the display panel 20 to display a frame so that one frame includes two sub-frames. That is, the controller 50 is configured to cause the display panel 20 to display two frames continuously displayed in the one or more first display region 21 as one parallax image frame including the first sub-frame and the second sub-frame. The controller 50 may be configured to be able to control the one or more first barrier region 31 according to the parallax image displayed in the one or more first display region 21. The controller 50 may be configured to be able to control the parallax image to be displayed in the one or more first display region 21 according to the plurality of right-eye visible regions 21R and the plurality of left-eye visible regions 21L, which have been formed by the one or more first barrier region 31.

The controller 50 may be configured to display the plurality of second sub-left-eye images 232L in the region where the plurality of first sub-right-eye images 231R have been displayed at the timing of changing the display from the first sub-frame to the second sub-frame. The controller 50 may be configured to display the plurality of second sub-right-eye images 232R in the region where the plurality of first sub-left-eye images 231L have been displayed at the same timing. By doing so, the display positions of the plurality of left-eye images 23L and the plurality of right-eye images 23R can be exchanged. The display positions of the plurality of left-eye images 23L are included in display attributes of the plurality of left-eye images 23L. The display positions of the plurality of right-eye images 23R are included in display attributes of the plurality of right-eye images 23R.

The controller 50 is configured to display a plane image frame including the plane image 24 in a portion of the displayed frame located in the one or more second display region 22. The controller 50 is configured to be able to control the one or more second barrier region 32 of the barrier panel 30 according to the plane image 24 displayed in the one or more second display region 22.

When the controller 50 displays the frame of FIG. 8 and the frame of FIG. 9 on the display panel 20 as two consecutive frames, the controller 50 is configured to be able to control the portion located in the one or more second display region 22 as two consecutive plane image frames.

One frame is configured to be displayed simultaneously in the one or more first display region 21 and the one or more second display region 22. That is, the frame rate in the portion displayed in the one or more first display region 21 and the frame rate in the portion displayed in the one or more second display region 22 are configured to be the same. The frame rate of the sub-frame of the parallax image frame displayed in the one or more first display region 21 is configured to be the same as the frame rate of the plane image frame displayed in the one or more second display region 22. In other words, the frame rate of the parallax image frame displayed in the one or more first display region 21 is configured to be half the frame rate of the plane image frame displayed in the one or more second display region 22.

The image display device 10 according to the present embodiment can be configured so that each eye of the user visually recognizes the parallax image with less image deterioration from full pixels in the one or more first display region 21 and can be configured so that the user visually recognizes the plane image 24 having a large frame rate in the one or more second display region 22. As a result, the image quality of the image display device 10 is improved.

The controller 50 is configured to be able to control the plurality of light-transmitting portions 31T and the plurality of dimming portions 31S of the barrier panel 30 so that the plurality of right-eye visible regions 21R are formed in the one or more first display region 21 in each of the first sub-frame and the second sub-frame. The controller 50 may be configured to be able to control the barrier panel 30 so that the plurality of right-eye visible regions 21R formed by the first sub-frame and the plurality of right-eye visible regions 21R formed by the second sub-frame do not overlap each other. The controller 50 is configured to be able to control the plurality of light-transmitting portions 31T and the plurality of dimming portions 31S of the barrier panel 30 so that the plurality of left-eye visible regions 21L are formed in the one or more first display region 21 in each of the first sub-frame and the second sub-frame. The controller 50 may be configured to be able to control the barrier panel 30 so that the plurality of left-eye visible regions 21L formed by the first sub-frame and the plurality of left-eye visible regions 21L formed by the second sub-frame do not overlap each other. The controller 50 may be configured to cause the display panel 20 to display the plurality of right-eye images 23R and the plurality of left-eye images 23L according to the formed plurality of right-eye visible regions 21R and the formed plurality of left-eye visible regions 21L.

In the present embodiment, the controller 50 may be configured to be able to control the display panel 20 and the barrier panel 30 on the assumption that the positions of the eyes of the user are the same while displaying one parallax image frame until a new parallax image frame is displayed. That is, when the positions of the eyes of the user are different between the first sub-frame and the second sub-frame, assuming that the positions of the eyes in each sub-frame are the same, it may be configured so that the plurality of right-eye visible regions 21R are formed.

When the controller 50 causes the display panel 20 to display the second sub-frame included in the same parallax image frame following the first sub-frame, the controller 50 may be configured to be able to determine the positions of the plurality of right-eye visible regions 21R in the second sub-frame based on the positions of the plurality of right-eye visible regions 21R in the first sub-frame. In this case, the controller 50 is configured to be able to determine the positions of the plurality of right-eye visible regions 21R without depending on the positions of the eyes of the user.

When the controller 50 causes the display panel 20 to display the first sub-frame of the new parallax image frame following the second sub-frame, the controller 50 may be configured to be able to determine the positions of the plurality of right-eye visible regions 21R in the first sub-frame without depending on the positions of the plurality of right-eye visible regions 21R in the second sub-frame. In this case, the controller 50 is configured to be able to determine the positions of the plurality of right-eye visible regions 21R, based on the positions of the eyes of the user instead of the positions of the plurality of right-eye visible regions 21R in the second sub-frame displayed immediately before the display of the first sub-frame.

It is assumed that when the positions of the eyes of the user are different between the first sub-frame and the second sub-frame, the plurality of right-eye visible regions 21R are configured to be able to be formed based on the positions of the eyes in each sub-frame. In this case, in at least one of the plurality of first sub-right-eye images 231R displayed in the first sub-frame and the plurality of second sub-right-eye images 232R displayed in the second sub-frame, a phenomenon that the display is shifted with respect to the plurality of right-eye visible regions 21R can occur. This phenomenon is caused by the fact that the plurality of first sub-right-eye images 231R and the plurality of second sub-right-eye images 232R do not overlap each other. When the phenomenon occurs, crosstalk occurs.

When the plurality of second sub-right-eye images 232R are changed according to the change in the positions of the eyes of the user, the plurality of first sub-right-eye images 231R and the plurality of second sub-right-eye images 232R overlaps at least in part. As a result, the image quality of the plurality of right-eye images 23R seen by the user deteriorates.

Until here, as a description related to the right eye 5R, the display mode of the plurality of right-eye images 23R in the plurality of right-eye visible regions 21R has been described, but the display mode of the plurality of left-eye images 23L in the plurality of left-eye visible regions 21L can be described identically or similar to those related to the right eye 5R.

According to the image display device 10 according to the present embodiment, the controller 50 is configured to be able to control the display panel 20 and the barrier panel 30 on the assumption that the positions of the eyes of the user are the same while one parallax image frame is displayed. By doing so, crosstalk is less likely to occur and the quality of the image seen by the user is less likely to deteriorate.

Figure 10:
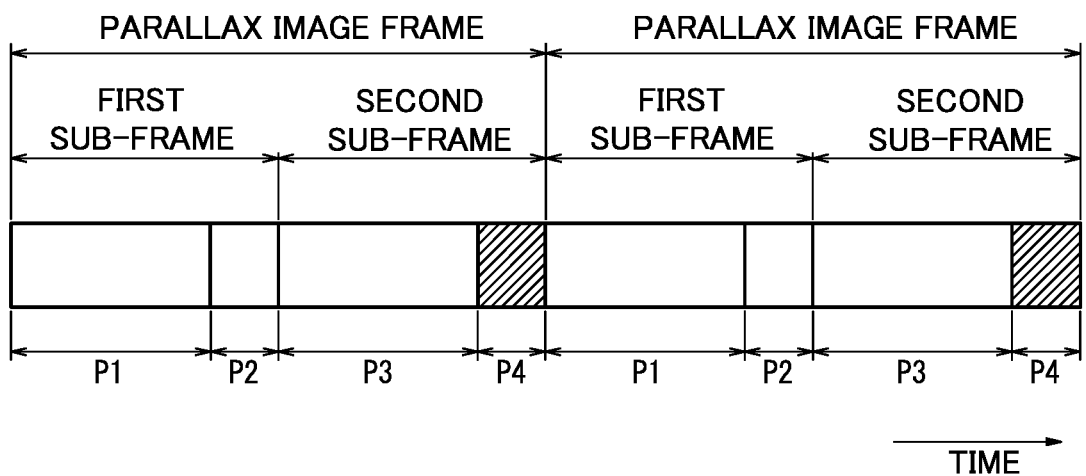
FIG. 10 is a timing chart showing a control timing of a one or more first barrier region.

The controller 50 is configured to cause the display panel 20 to display a portion located in the one or more first display region 21 as one parallax image frame including the first sub-frame and the second sub-frame. The controller 50 is configured to be able to control the one or more first barrier region 31 corresponding to the one or more first display region 21 according to the change of the sub-frame and the change of the parallax image frame. That is, the controller 50 is configured to be able to control the one or more first barrier region 31 for each sub-frame. As shown in FIG. 10, the controller 50 may be configured to be able to control the one or more first barrier region 31 by dividing each sub-frame into two periods. In FIG. 10, it is assumed that time advances as the period is located to the right. The controller 50 may be configured to be able to control the one or more first barrier region 31 by dividing the period displaying the first sub-frame into two periods represented by P1 and P2. The period represented by P1 corresponds to the period from the start of the first sub-frame to the elapse of a predetermined time. The period represented by P2 corresponds to the period from the end of the period represented by P1 to the end of the first sub-frame and includes the timing of the change from the first sub-frame to the second sub-frame. The period represented by P2 is also called a sub-frame change period. The controller 50 may be configured to be able to control the one or more first barrier region 31 by dividing the period displaying the second sub-frame into two periods represented by P3 and P4. The period represented by P3 corresponds to the period from the start of the second sub-frame to the elapse of a predetermined time. The period represented by P4 corresponds to the period from the end of the period represented by P3 to the end of the second sub-frame and includes the timing of the change from the second sub-frame to the first sub-frame. That is, the period represented by P4 includes the timing of the change from the displayed parallax image frame to a new parallax image frame. The period represented by P4 is also called a frame change period. The controller 50 may be configured to be able to control the one or more first barrier region 31 by dividing the period in which one parallax image frame is displayed into four periods represented by P1 to P4.

The controller 50 is configured to form the plurality of light-transmitting portions 31T and the plurality of dimming portions 31S in the one or more first barrier region 31 so that the plurality of right-eye visible regions 21R and the plurality of left-eye visible regions 21L corresponding to the first sub-frame are formed during the period represented by P1. That is, the controller 50 is configured to form, in the one or more first display region 21, the plurality of right-eye visible regions 21R and the plurality of left-eye visible regions 21L, which correspond to the plurality of first sub-right-eye images 231R and the plurality of first sub-left-eye images 231L displayed in the one or more first display region 21.

During the period represented by P2, the controller 50 is configured to maintain the state of the one or more first barrier region 31 of the barrier panel 30 in the period represented by P1.

The controller 50 is configured to form the plurality of light-transmitting portions 31T and the plurality of dimming portions 31S in the one or more first barrier region 31 so that the plurality of right-eye visible regions 21R and the plurality of left-eye visible regions 21L corresponding to the second sub-frame are formed during the period represented by P3. That is, the controller 50 is configured to form, in the one or more first display region 21, the plurality of right-eye visible regions 21R and the plurality of left-eye visible regions 21L, which correspond to the plurality of second sub-right-eye images 232R and the plurality of second sub-left-eye images 232L displayed in the one or more first display region 21.

The controller 50 is configured to form a one or more dimming portion 31S in entirety of the one or more first barrier region 31 and to display the entirety of the one or more first barrier region 31 in black during the period represented by P4. The hatching of diagonal lines attached to the period represented by P4 corresponds to displaying the entirety of the one or more first barrier region 31 in black.

The controller 50 is configured to end the control of the period represented by P4 and to end the display of one parallax image frame. The controller 50 is configured to newly start controlling the period represented by P1 and to display a new parallax image frame. By displaying the entirety of the one or more first barrier region 31 in black before the timing when the displayed parallax image frame is switched, the user is less likely to feel the afterimage of the frame displayed before the switching. As a result, image quality is improved.

The controller 50 may be configured to set the transmittance of each pixel of the one or more first barrier region 31 lower than the transmittance of the plurality of light-transmitting portions 31T during the period represented by P4. Even by making the transmittance of the one or more first barrier region 31 lower than the transmittance of the plurality of light-transmitting portions 31T, the user is less likely to feel the afterimage of the frame displayed before the switching. As a result, image quality is improved.

The controller 50 is configured to maintain the state of the one or more first barrier region 31 during the period represented by P2. That is, the controller 50 is configured so that the one or more first barrier region 31 is not displayed in black or the transmittance of the one or more first barrier region 31 is not lowered before the timing of switching from the first sub-frame to the second sub-frame. By doing so, the user easily feels the afterimage of the image displayed in the first sub-frame. By doing so, the user feels like visually recognizing both the full-pixel right-eye image 23R and the full-pixel left-eye image 23L, which are composed of the afterimage of the first sub-frame and the real image displayed in the second sub-frame. As a result, image quality is improved.

The controller 50 is configured to be able to control the barrier panel 30 for each period in which the parallax image frame is divided into four, so that the controller 50 is configured to generate a situation in which the user easily feels an afterimage between the sub-frames and is configured to generate a situation in which the user is less likely to feel an afterimage between parallax image frames. As a result, image quality is improved.

Figure 11:
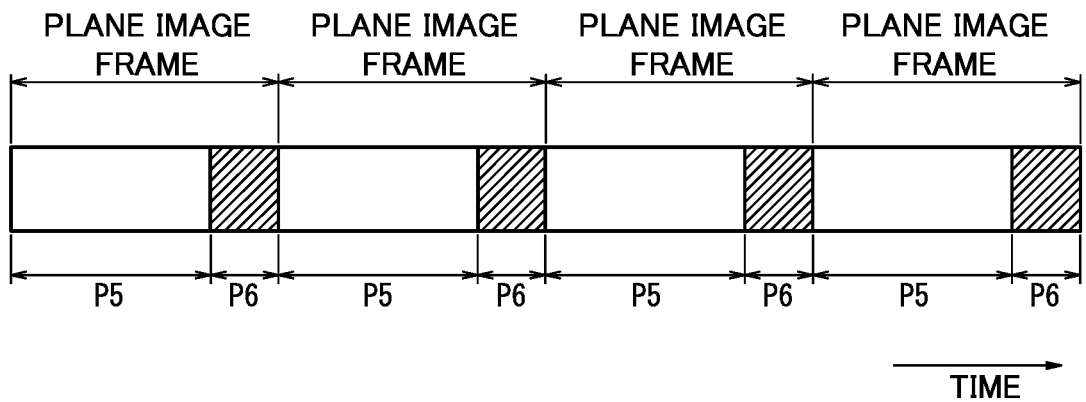
FIG. 11 is a timing chart showing a control timing of a one or more second barrier region.

The controller 50 is configured to display a plane image frame including the plane image 24 in a portion located in the one or more second display region 22. The controller 50 is configured to be able to control the one or more second barrier region 32 corresponding to the one or more second display region 22 according to the change of the plane image frame. That is, the controller 50 is configured to be able to control the one or more second barrier region 32 for each plane image frame. As shown in FIG. 11, the controller 50 may be configured to be able to control each plane image frame in two periods. In FIG. 11, it is assumed that the time advances as the period is located to the right. The controller 50 may be configured to be able to control the barrier panel 30 by dividing the period in which the plane image frame is displayed into two periods represented by P5 and P6. The period represented by P5 corresponds to the period from the start of the plane image frame to the elapse of a predetermined time. The period represented by P6 corresponds to the period from the end of the period represented by P5 to the end of the plane image frame and includes the timing of the change from the displayed plane image frame to a new plane image frame.

The controller 50 is configured to form the one or more dimming portion 31S in the one or more second barrier region 32 to correspond to the black display included in the plane image 24 displayed in the plane image frame during the period represented by P5.

The controller 50 is configured to form the one or more dimming portion 31S in entirety of the one or more second barrier region 32 and to display the entirety of the one or more second barrier region 32 in black during the period represented by P6. The hatching of diagonal lines attached to the period represented by P6 corresponds to displaying the entirety of the one or more second barrier region 32 in black.

The controller 50 is configured to end the control of the period represented by P6 and end the display of one plane image frame. The controller 50 is configured to newly start controlling the period represented by P5 and display a new plane image frame. The entirety of the one or more second barrier region 32 is displayed in black before the timing at which the displayed plane image frame is switched, so that the user temporarily visually recognizes the black image. By temporarily visually recognizing the black image, the user is less likely to feel the afterimage of the frame that has been displayed before the switching. As a result, image quality is improved.

The controller 50 may be configured to set the transmittance of each pixel in the one or more second barrier region 32 lower than the transmittance of the plurality of light-transmitting portions 31T during the period represented by P6. By making the transmittance of the one or more second barrier region 32 lower than the transmittance of the plurality of light-transmitting portions 31T, the brightness of the image visually recognized by the user is temporarily reduced. By the temporarily reduced brightness of the image, the user is less likely to feel the afterimage of the frame that has been displayed before the switching. As a result, image quality is improved. A display state in which the brightness of an image is reduced is also called a low-luminance display.

The controller 50 can create a situation in which the user is less likely to feel an afterimage between the plane image frames by being configured to be able to control the barrier panel 30 for each period in which the plane image frame is divided into two. As a result, image quality is improved.

The period represented by P5 that controls the one or more second barrier region 32 is configured to coincide with either the period represented by P1 or the period represented by P3, which controls the one or more first barrier region 31. The period represented by P6 that controls the one or more second barrier region 32 is configured to coincide with either the period represented by P2 or the period represented by P4, which controls the one or more first barrier region 31. The period represented by P6 is also called a plane image frame change period. The plane image frame change period is configured to coincide with either the sub-frame change period or the frame change period.

The controller 50 is configured to display the entirety of the one or more first barrier region 31 in black or in low brightness and is configured to display the entirety of the one or more second barrier region 32 in black or in low brightness, during the frame change period. The controller 50 is configured to display the one or more first barrier region 31 neither in black nor in low brightness but is configured to display the entirety of the one or more second barrier region 32 in black or in low brightness, during the sub-frame change period. By doing so, the user easily feels the afterimage between the sub-frames and the user hardly feels the afterimage between the parallax image frames and between the plane image frames. As a result, image quality is improved.

The unit period of control of the barrier panel 30 may be configured to have the same length or may be configured to have a different length. If the controller 50 is configured to be operable based on a clock signal, which is a periodic signal, the unit period of control of the barrier panel 30 is likely to be configured to have the same length. The controller 50 may be configured to be able to control the state of each pixel of the barrier panel 30 in combination with an enable signal to vary the length of each period. The enable signal may be used to control the timing at which the state of each pixel is actually changed. The controller 50 may be configured to write in advance information about the state of each pixel in the period represented by each of P5 and P6 at a timing based on the clock signal. The controller 50 may be configured to reflect the information written in advance in the state of each pixel at the timing when the enable signal is input. The later the timing when the enable signal is input with respect to the timing when the information is written in advance, the later the start of the period. As a result, the period is shortened. For example, since the timing of input of the enable signal in the period represented by P6 is later than the timing of input of the enable signal in the period represented by P5, the period represented by P6 can be shorter than the period represented by P5.

The controller 50 may be configured to transition each pixel of the barrier panel 30 to one of two states, a white display state having the highest transmittance, and a black display state having the lowest transmittance. That is, the controller 50 may be configured to be able to control each pixel of the barrier panel 30 with two gradations, the highest gradation corresponding to the white display state and the lowest gradation corresponding to the black display state. In the present embodiment, it is assumed that the pixel is configured to transition to the black display state when no voltage is applied to the pixel, and the pixel is configured to transition to the white display state when a predetermined voltage is applied to the pixel. The predetermined voltage may be determined by the specifications of the barrier panel 30. That is, the controller 50 is configured to apply a voltage of either of the two values to the pixel and not to apply a voltage of an intermediate value. When the pixel is configured to be controllable with two gradations, the response of the pixel is faster than when the pixel is configured to be controllable with intermediate gradations. By making the response of the pixel faster, the period for controlling the state of the pixel is shortened. For example, the periods represented by P2, P4, and P6 are shortened.

The controller 50 is configured to display the entirety of the one or more first barrier region 31 and the one or more second barrier region 32 in black or in low brightness during the periods represented by P4 and P6. The user visually recognizes a black image or a low-luminance image while the entirety of the one or more first barrier region 31 and the one or more second barrier region 32 is displayed in black or in low brightness. By the black display or the low-luminance display, the brightness of the image seen by the user is configured to change with the passage of time even within one parallax image frame or one plane image frame. In this case, the time average value of the brightness of the image in one parallax image frame or one plane image frame decreases. That is, the brightness of the image seen by the user is reduced as a whole. By shortening the time for black display or low-luminance display, the brightness of the image seen by the user is increased. By shortening the periods represented by P4 and P6, the period of black display or low-luminance display is shortened. By doing so, the time average value of the brightness of the image in one parallax image frame or one plane image frame increases. As a result, the brightness of the image seen by the user is increased.

In the device according to the comparative example, the display panel 20 is configured to be displayed in black in a predetermined period while displaying one frame so that the user is less likely to feel the afterimage between the frames. In the comparative example, each pixel of the display panel 20 is configured to be controllable with an intermediate gradation. In this case, the response speed of the pixel to the control changing from the black display to the intermediate gradation is slower than the response speed of the pixel to the control changing between the two gradations of the black display and the white display. As a result, in the device according to the comparative example, the period of black display is difficult to be shortened. In other words, the image display device 10 according to the present embodiment easily shortens the period during which the pixels are displayed in black as compared with the device according to the comparative example. As a result, the image display device 10 according to the present embodiment can further increase the brightness of the image as compared with the device according to the comparative example.

Figure 12:
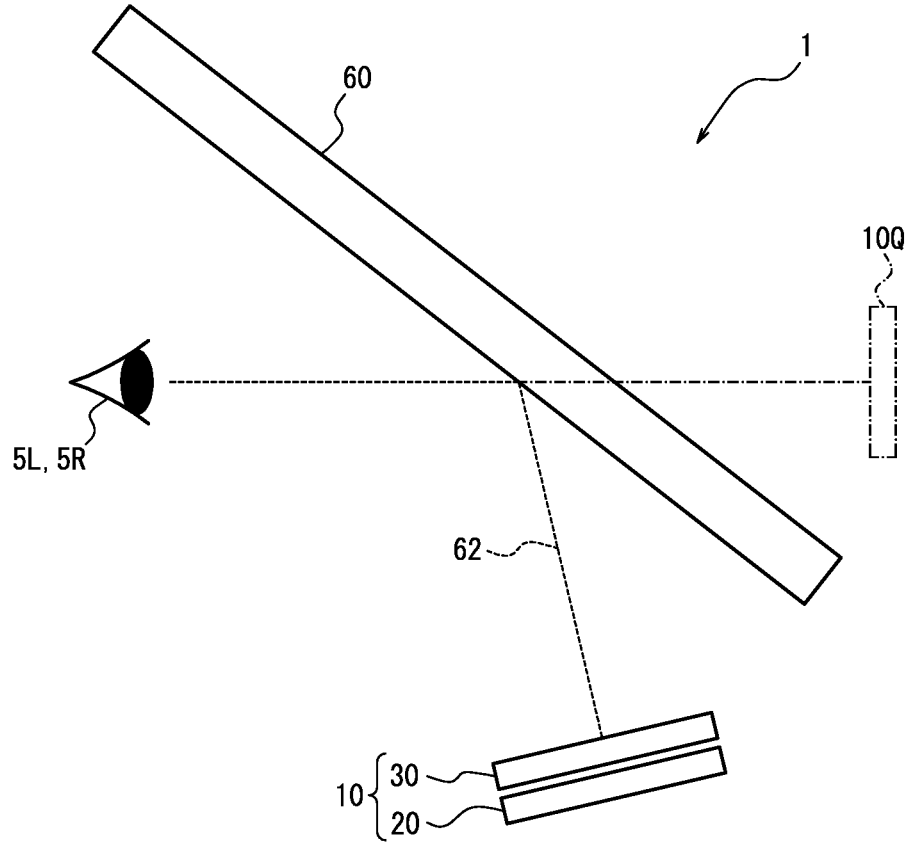
FIG. 12 is a diagram showing a configuration example of an image display system according to one embodiment.

As shown in FIG. 12, the image display system 1 according to an embodiment includes the image display device 10 and a reflective member 60. The image display system 1 is configured to display an image on the image display device 10 and to be able to emit the image light. The image light is configured to be reflected by the reflective member 60 along a path 62 shown by the broken line and to reach the left eye 5L and the right eye 5R of the user. By configuring the image light to be incident on the eyes of the user, the user can visually recognize the image displayed on the image display device 10. By visually recognizing the image light reflected by the reflective member 60, the user visually recognizes the image displayed on the image display device 10 as a virtual image 10Q. The virtual image 10Q is located at the end of the path extending the path 62 connecting the left eye 5L and the right eye 5R of the user and the reflective member 60 to the opposite side of the reflective member 60. The image display system 1 may be a head-up display (HUD). The image display system 1 and the image display device 10 may provide the user with stereoscopic vision by being directly viewed by the user.

The image display system 1 according to the present embodiment may be mounted on a mobile body. If the image display system 1 is mounted on a mobile body, the user of the image display system 1 may be a driver or operator of the mobile body, or a passenger. If the image display system 1 is mounted on a mobile body, a part of the configuration of the image display system 1 may be configured to be shared with other devices and parts included in the mobile body. For example, the windshield of the mobile body may be configured to be used as a part of the configuration of the image display system 1. For example, the reflective member 60 shown in FIG. 1 may be replaced by a windshield of the mobile body.

The "mobile body" in the disclosure includes vehicles, vessels, and aircraft. "Vehicles" in the disclosure include, but are not limited to, automobiles and industrial vehicles and may include railway vehicles, living vehicles, and fixed-wing aircraft traveling on runways. Automobiles include, but are not limited to, passenger cars, trucks, buses, motorcycles, trolleybuses, and the like and may include other vehicles traveling on the road. Industrial vehicles include industrial vehicles for agriculture and construction. Industrial vehicles include, but are not limited to, forklifts and golf carts. Industrial vehicles for agriculture include, but are not limited to, tractors, tillers, transplanters, binders, combines, and lawnmowers. Industrial vehicles for construction include, but are not limited to, bulldozers, scrapers, excavators, cranes, dump trucks, and road rollers. Vehicles include those that run manually. The classification of vehicles is not limited to the above. For example, an automobile may include an industrial vehicle capable of traveling on a road and the same vehicle may be included in a plurality of classifications. Vessels in the disclosure include marine jets, boats, and tankers. Aircraft in the disclosure includes fixed-wing aircraft and rotary-wing aircraft.

The configuration according to the disclosure is not limited to the embodiments described above and can be modified or changed in many ways. For example, the functions and the like included in each component and the like can be rearranged not to be logically inconsistent and a plurality of components and the like can be combined into one or divided.

The diagram illustrating the configuration according to the disclosure is schematic. The dimensional ratios on the drawings do not always match the actual ones.

In the disclosure, the descriptions such as "first" and "second" are identifiers for distinguishing the configuration. The configurations distinguished by the descriptions such as "first" and "second" in the disclosure can exchange the numbers in the configurations. For example, the first region can exchange the identifiers "first" and "second" with the second region. The exchange of identifiers takes place at the same time. Even after exchanging identifiers, the configuration is distinguished. The identifier may be removed. The configurations with the identifier removed are distinguished by reference numerals. Based solely on the description of identifiers such as "first" and "second" in the disclosure, it shall not be used for the interpretation of the order of the configurations, or the rationale for the existence of the lower number identifier.

In the disclosure, the X-axis, Y-axis, and Z-axis are provided for the convenience of explanation and may be interchanged with each other. The configuration according to the disclosure has been described using a Cartesian coordinate system composed of the X-axis, the Y-axis, and the Z-axis. The positional relationship of each configuration according to the disclosure is not determined to be orthogonal.

REFERENCE SIGNS LIST

1: Image display system
5L: Left eye
5R: Right eye
10: Image display device

10Q: Virtual image
20: Display panel
21L: Left-eye visible region
21R: Right-eye visible region
22L: Left-eye non-visible region
22R: Right-eye non-visible region
30: Barrier panel
31: First barrier region
31T: Light-transmitting portion
31S: Dimming portion
32: Second barrier region
50: Controller
60: Reflective member
62: Path

The invention claimed is:

1. An image display device, comprising:
a display panel configured to be able to display a plurality of frames;
a barrier panel positioned to overlap the display panel and configured to be able to form a one or more light-transmitting portion and a one or more dimming portion by which a traveling direction of at least part of image light emitted from the display panel is directed to a right eye of a user and a traveling direction at least part of the image light is directed to a left eye of the user; and
a controller configured to be able to control the display panel and the barrier panel, wherein
the display panel is configured to be able to form a one or more first display region, and
the display panel is configured to be able to display a right-eye image visually recognized by the user's right eye in a one or more right-eye visible region of the one or more first display region and is configured to be able to display a left-eye image visually recognized by the user's left eye in a one or more left-eye visible region of the one or more first display region,
the barrier panel is configured to be able to form a one or more first barrier region corresponding to the one or more first display region, and
the barrier panel is configured to form the one or more light-transmitting portion and the one or more dimming portion in the one or more first barrier region so that the one or more right-eye visible region and the one or more left-eye visible region are located at different positions of the one or more first display region, and
the controller is configured to cause the display panel to display a portion located in the one or more first display region as one parallax image frame comprising a first sub-frame and a second sub-frame when displaying two consecutive frames on the display panel,
the controller is configured to be able to control display of the parallax image in the one or more first display region and formation of the one or more light-transmitting portion and the one or more dimming portion in the one or more first barrier region for each parallax image frame so that the user visually recognizes images displayed in the first sub-frame and the second sub-frame included in the one parallax image frame as one parallax image, and
the controller is configured to form the one or more dimming portion in entirety of the one or more first barrier region during a frame change period comprising a timing of changing a display from the parallax image frame to a new parallax image frame.

2. The image display device according to claim 1, wherein when the second sub-frame is displayed following the first sub-frame in the one or more first display region, the controller
is configured to determine respective positions of the one or more right-eye visible region and the one or more left-eye visible region in the second sub-frame, based on respective positions of the one or more right-eye visible region and the one or more left-eye visible region in the first sub-frame, and
when the first sub-frame is displayed following the second sub-frame in the one or more first display region, the controller is configured to determine the respective positions of the one or more right-eye visible region and the one or more left-eye visible region in the second sub-frame, based on positions of the eyes of the user instead of the respective positions of the one or more right-eye visible region and the one or more left-eye visible region in the second sub-frame displayed immediately before a display of the first sub-frame.

3. The image display device according to claim 1, wherein
the display panel is configured to form a one or more second display region, and
the display panel is configured to be able to display a plane image visually recognized by both eyes of the user in the one or more second display region,
the barrier panel is configured to be able to form a one or more second barrier region corresponding to the one or more second display region, and
the barrier panel is configured to be able to form the one or more light-transmitting portion and the one or more dimming portion in the one or more second barrier region according to the plane image displayed in the one or more second display region, and
the controller is configured to cause the display panel to display a portion located in the one or more second display region as two plane image frames when two consecutive frames are displayed on the display panel,
the controller is configured to be able to control display of the plane image in the one or more second display region and formation of the one or more light-transmitting portion and the one or more dimming portion in the one or more second barrier region for each plane image frame, and
the controller is configured so that a frame rate of the sub-frame comprised in the parallax image frame and a frame rate of the plane image frame are a same, and
the controller is configured not to form the one or more dimming portion in the entirety of the one or more first barrier region and is configured to form the one or more dimming portion in entirety of the one or more second barrier region during a sub-frame change period comprising a timing of changing display from the first sub-frame to the second sub-frame in the one or more first display region.

4. The image display device according to claim 3, wherein
at least a part of the one or more second display region comprises a black display region, and
the controller is configured to cause the barrier panel to form the one or more dimming portion in a region corresponding to the black display region in the one or more second barrier region.

5. The image display device according to claim 4, wherein
the controller is configured to be able to control formation of the one or more light-transmitting portion and the one or more dimming portion in the one or more second barrier region for each plane image frame based on positions of the eyes of the user.

6. The image display device according to claim 1, wherein
the right-eye image comprises a first sub-right-eye image displayed in the first sub-frame and a second sub-right-eye image displayed in the second sub-frame,
the left-eye image comprises a first sub-left-eye image displayed in the first sub-frame without overlapping with the first sub-right-eye image and a second sub-left-eye image displayed in the second sub-frame without overlapping with the second sub-right-eye image, and
the controller is configured to display the second sub-left-eye image in the region where the first sub-right-eye image has been displayed and is configured to display the second sub-right-eye image in the region where the first sub-left-eye image has been displayed, at the timing of changing the display from the first sub-frame to the second sub-frame.

7. The image display device according to claim 1, wherein
the controller comprises a first controller that controls the display panel and a second controller that controls the barrier panel, and
the first controller and the second controller are configured to be able to be synchronized.

8. An image display system, comprising:
an image display device comprising
a display panel configured to be able to display a plurality of frames,
a barrier panel positioned to overlap the display panel and configured to be able to form a one or more light-transmitting portion and a one or more dimming portion by which a traveling direction of at least part of image light emitted from the display panel is directed to a right eye of a user and a traveling direction of at least part of the image light is directed to a left eye of the user, and
a controller configured to be able to control the display panel and the barrier panel; and
a reflective member, wherein
the display panel is configured to be able to form a one or more first display region, and
the display panel is configured to be able to display a right-eye image visually recognized by the user's right eye in a one or more right-eye visible region of the one or more first display region and is configured to be able to display a left-eye image visually recognized by the user's left eye in a one or more left-eye visible region of the one or more first display region,
the barrier panel is configured to be able to form a one or more first barrier region corresponding to the one or more first display region, and
the barrier panel is configured to form the one or more light-transmitting portion and the one or more dimming portion in the one or more first barrier region so that the one or more right-eye visible region and the one or more left-eye visible region are located at different positions of the one or more first display region, and
the controller is configured to cause the display panel to display a portion located in the one or more first display region as one parallax image frame comprising a first sub-frame and a second sub-frame when displaying two consecutive frames on the display panel,
the controller is configured to be able to control display of the parallax image in the one or more first display region and formation of the one or more light-transmitting portion and the one or more dimming portion in the one or more first barrier region for each parallax image frame so that the user visually recognizes images displayed in the first sub-frame and the second sub-frame included in the one parallax image frame as one parallax image, and
the controller is configured to form the one or more dimming portion in entirety of the one or more first barrier region during a frame change period comprising a timing of changing a display from the parallax image frame to a new parallax image frame, and
the reflective member is configured to reflect the image light to reach the left and right eyes of the user.

9. The image display system according to claim 8, wherein
when the second sub-frame is displayed following the first sub-frame in the one or more first display region, the controller is configured to determine the respective positions of the one or more right-eye visible region and the one or more left-eye visible region in the second sub-frame, based on respective positions of the one or more right-eye visible region and the one or more left-eye visible region in the first sub-frame, and
when the first sub-frame is displayed following the second sub-frame in the one or more first display region, the controller is configured to determine the respective positions of the one or more right-eye visible region and the one or more left-eye visible region in the second sub-frame, based on positions of the eyes of the user instead of the respective positions of the one or more right-eye visible region and the one or more left-eye visible region in the second sub-frame displayed immediately before a display of the first sub-frame.

10. The image display system according to claim 8, wherein
the display panel is configured to form a one or more second display region, and
the display panel is configured to be able to display a plane image visually recognized by both eyes of the user in the one or more second display region,
the barrier panel is configured to be able to form a one or more second barrier region corresponding to the one or more second display region, and
the barrier panel is configured to be able to form the one or more light-transmitting portion and the one or more dimming portion in the one or more second barrier region according to the plane image displayed in the second display region, and
the controller is configured to cause the display panel to display a portion located in the one or more second display region as two plane image frames when two consecutive frames are displayed on the display panel,
the controller is configured to be able to control display of the plane image in the one or more second display region and formation of the one or more light-transmitting portion and the one or more dimming portion in the one or more second barrier region for each plane image frame, and
the controller is configured so that a frame rate of the sub-frame comprised in the parallax image frame and a frame rate of the plane image frame are a same, and
the controller is configured not to form the one or more dimming portion in the entirety of the one or more first barrier region and is configured to form the one or more dimming portion in entirety of the one or more second barrier region during a sub-frame change period comprising a timing of changing display from the first sub-frame to the second sub-frame in the one or more first display region.

11. The image display system according to claim 8, wherein
the right-eye image comprises a first sub-right-eye image displayed in the first sub-frame and a second sub-right-eye image displayed in the second sub-frame,
the left-eye image comprises a first sub-left-eye image displayed in the first sub-frame without overlapping with the first sub-right-eye image and a second sub-left-eye image displayed in the second sub-frame without overlapping with the second sub-right-eye image, and
the controller is configured to display the second sub-left-eye image in the region where the first sub-right-eye image has been displayed and is configured to display the second sub-right-eye image in the region where the first sub-left-eye image has been displayed, at the timing of changing the display from the first sub-frame to the second sub-frame.

12. A mobile body, comprising:
an image display system comprising
an image display device comprising
a display panel configured to be able to display a plurality of frames,
a barrier panel positioned to overlap the display panel and configured to be able to form a one or more light-transmitting portion and a one or more dimming portion by which a traveling direction of at least part of image light emitted from the display panel is directed to a right eye of a user and a traveling direction of at least part of the image light is directed to a left eye of the user, and
a controller configured to be able to control the display panel and the barrier panel; and
a reflective member, wherein
the display panel is configured to be able to form a one or more first display region, and
the display panel is configured to be able to display a right-eye image visually recognized by the user's right eye in a one or more right-eye visible region of the one or more first display region and is configured to be able to display a left-eye image visually recognized by the user's left eye in a one or more left-eye visible region of the one or more first display region,
the barrier panel is configured to be able to form a one or more first barrier region corresponding to the one or more first display region, and
the barrier panel is configured to form the one or more light-transmitting portion and the one or more dimming portion in the one or more first barrier region so that the one or more right-eye visible region and the one or more left-eye visible region are located at different positions of the one or more first display region,
the controller is configured to cause the display panel to display a portion located in the one or more first display region as one parallax image frame comprising a first sub-frame and a second sub-frame when displaying two consecutive frames on the display panel,
the controller is configured to be able to control display of the parallax image in the one or more first display region and formation of the one or more light-transmitting portion and the one or more dimming portion in the one or more first barrier region for each parallax image frame so that the user visually recognizes images displayed in the first sub-frame and the second sub-frame included in the one parallax image frame as one parallax image, and
the controller is configured to form the one or more dimming portion in entirety of the one or more first barrier region during a frame change period comprising a timing of changing a display from the parallax image frame to a new parallax image frame, and
the reflective member is configured to reflect the image light to reach the left and right eyes of the user.

13. The mobile body according to claim 12, wherein
when the second sub-frame is displayed following the first sub-frame in the one or more first display region, the controller is configured to determine the respective positions of the one or more right-eye visible region and the one or more left-eye visible region in the second sub-frame, based on respective positions of the one or more right-eye visible region and the one or more left-eye visible region in the first sub-frame, and
when the first sub-frame is displayed following the second sub-frame in the one or more first display region, the controller is configured to determine the respective positions of the one or more right-eye visible region and the one or more left-eye visible region in the second sub-frame, based on positions of the eyes of the user instead of the respective positions of the one or more right-eye visible region and the one or more left-eye visible region in the second sub-frame displayed immediately before a display of the first sub-frame.

14. The mobile body according to claim 12, wherein
the display panel is configured to form a one or more second display region, and
the display panel is configured to be able to display a plane image visually recognized by both eyes of the user in the one or more second display region,
the barrier panel is configured to be able to form a one or more second barrier region corresponding to the one or more second display region, and
the barrier panel is configured to be able to form the one or more light-transmitting portion and the one or more dimming portion in the one or more second barrier region according to the plane image displayed in the one or more second display region, and
the controller is configured to cause the display panel to display a portion located in the one or more second display region as two plane image frames when two consecutive frames are displayed on the display panel,
the controller is configured to be able to control display of the plane image in the one or more second display region and formation of the one or more light-transmitting portion and the one or more dimming portion in the one or more second barrier region for each plane image frame, and
the controller is configured so that a frame rate of the sub-frame comprised in the parallax image frame and a frame rate of the plane image frame are a same, and
the controller is configured not to form the one or more dimming portion in the entirety of the one or more first barrier region and is configured to form the one or more dimming portion in entirety of the one or more second barrier region during a sub-frame change period comprising a timing of changing display from the first sub-frame to the second sub-frame in the one or more first display region.

15. The mobile body according to claim 12, wherein
the right-eye image comprises a first sub-right-eye image displayed in the first sub-frame and a second sub-right-eye image displayed in the second sub-frame,
the left-eye image comprises a first sub-left-eye image displayed in the first sub-frame without overlapping with the first sub-right-eye image and a second sub-left-eye image displayed in the second sub-frame without overlapping with the second sub-right-eye image, and
the controller is configured to display the second sub-left-eye image in the region where the first sub-right-eye image has been displayed and is configured to display the second sub-right-eye image in the region where the first sub-left-eye image has been displayed, at the timing of changing the display from the first sub-frame to the second sub-frame.

* * * * *